(12) United States Patent
Minano Dominguez et al.

(10) Patent No.: US 7,160,522 B2
(45) Date of Patent: Jan. 9, 2007

(54) DEVICE FOR CONCENTRATING OR COLLIMATING RADIANT ENERGY

(75) Inventors: Juan Carlos Minano Dominguez, Madrid (ES); Pablo Benitez Gimenez, Madrid (ES)

(73) Assignee: Light Prescriptions Innovators-Europe, S.L., Madrid (ES)

( * ) Notice: Subject to any disclaimer, the term of this patent is extended or adjusted under 35 U.S.C. 154(b) by 491 days.

(21) Appl. No.: 10/148,736

(22) PCT Filed: Dec. 1, 2000

(86) PCT No.: PCT/ES00/00459

§ 371 (c)(1),
(2), (4) Date: Oct. 15, 2002

(87) PCT Pub. No.: WO01/40829

PCT Pub. Date: Jun. 7, 2001

(65) Prior Publication Data

US 2003/0075167 A1 Apr. 24, 2003

(30) Foreign Application Priority Data

Dec. 2, 1999 (ES) ................................ P 9902661

(51) Int. Cl.
*B01J 19/08* (2006.01)
*F21V 5/00* (2006.01)
(52) U.S. Cl. .................. 422/186.3; 126/698; 362/338; 362/336; 362/334
(58) Field of Classification Search ............... 422/186, 422/186.3; 126/698; 362/338, 334, 336
See application file for complete search history.

(56) References Cited

U.S. PATENT DOCUMENTS

| 4,337,759 | A | | 7/1982 | Popovich et al. | |
|---|---|---|---|---|---|
| 5,404,869 | A | | 4/1995 | Parkyn, Jr. et al. | |
| 5,577,492 | A | | 11/1996 | Parkyn, Jr. et al. | |
| 5,577,493 | A | * | 11/1996 | Parkyn et al. | 126/699 |
| 5,613,769 | A | * | 3/1997 | Parkyn et al. | 362/338 |
| 5,676,453 | A | | 10/1997 | Parkyn, Jr. et al. | |

FOREIGN PATENT DOCUMENTS

WO WO 9 321 484 10/1993

* cited by examiner

*Primary Examiner*—Kishor Mayekar
(74) *Attorney, Agent, or Firm*—Clark & Brody

(57) ABSTRACT

This invention consists in a nonimaging device for concentration or collimation of radiation on a receiver or from an emitter (14), depending on the case. The device is made up of the lens (50), which surrounds the receiver and consists of the aspheric surface (21), and the lens (15), whose upper refractive surface (16) may be aspheric, while the lower surface is aspheric (17) in its central portion (between points 18 and 19) and has a structure with discontinuous slope (20) in its external portion, in which the faces (22) fundamentally refract the rays while the faces (23) reflect them by total internal reflection. The design method provides that the device properties of concentration/collimation are noticeably superior to those of the existing inventions. Possible applications of this lens include: radiation sensors, illumination systems with LEDs, wireless optical communications and photovoltaic solar energy.

28 Claims, 4 Drawing Sheets

DEVICE FOR CONCENTRATING OR COLLIMATING RADIANT ENERGY

This application is a 35 U.S.C. 371 National Stage filing of PCT/ES00/00459 on Dec. 01, 2000.

TECHNICAL SECTOR

It falls within the category of optical systems; specifically, that of Nonimaging Optics.

PREVIOUS TECHNIQUES

There exist previous inventions related to the present invention, all related to one another, for which various patents have been taken out (U.S. Pat. Nos. 4,337,759; 5,404,869; 5,577,493). While in a general way some of the possible geometries of the present invention are qualitatively similar to those of these previous inventions, there are several fundamental differences that make this invention novel, and rule out any conflict with the others. These differences lead to the optical surfaces of the invention being substantially different, due to the fact that the conditions imposed on their design are different, and therefore also their resulting optical performance. In particular, the invention presented here can work very close (>95%) to the thermodynamic limit of concentration/collimation, while the previous inventions, not based on the tools of Nonimaging Optics, are well short of this limit (<80%) when the angular spread of the ray bundles on passing through any of the optical surfaces is large (>10°).

The related patents are: the patent of Popovich et al. U.S. Pat. No. 4,337,759, July 1982; that of W. A. Parkyn, Jr. et al., U.S. Pat. No. 5,404,869, April 1995, and lastly, that of W. A. Parkyn, Jr. et al., U.S. Pat. No. 5,577,493, November 1996.

The designs of all the mentioned inventions are not based (in contrast to this one) on the edge-ray theorem of Nonimaging Optics, so that their functioning is limited with the extended bundles produced by many emitters and receivers used in practice. The patents U.S. Pat. No. 4,337,759, July 1982 and U.S. Pat. No. 5,404,869, April 1995 consider only the central ray of the bundles in the design. U.S. Pat. No. 5,577,493, November 1996 considers the so-called first-order optics around the central ray (Luneburg, 1964), which provides an order of approximation superior to the previously-mentioned device, but even so, the performance attributed to it by its inventors for producing constant irradiance is only accurate for bundles with very small angular spread.

Furthermore, the invention protected by U.S. Pat. No. 5,577,493, November 1996 is axisymmetrical and considers as output bundle that produces uniform irradiance in 3D at the exit aperture. This bundle is only a particular case of those considered in the present patent.

DESCRIPTION OF THE INVENTION

This invention consists in a nonimaging concentration or collimation device made of two aspheric lenses, one of them containing a structure with discontinuous slope (i.e., faceted), that concentrate the radiation incident on a receiver or collimate the radiation from an emitter, depending on the case. The design method of this concentrator is based on the nonimaging design method of Simultaneous Multiple Surfaces or SMS (Miñano, González, 1992).

Figure 1A:
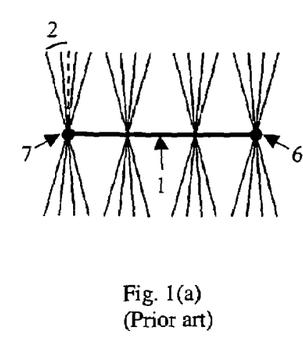
FIG. 1(a) illustrates a known type 1 bundle comprising rays that impinge on a segment (1) of edges (6) and (7) forming an angle inferior to the acceptance angle of the bundle (2) with the perpendicular to that segment.
Figure 1B:
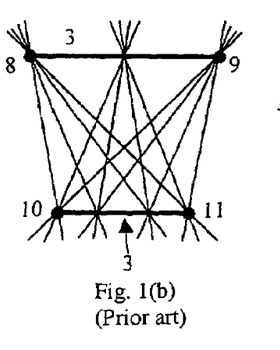
FIG. 1(b) illustrates a known type 2 bundle comprising rays that intercept two given segments (3). The edge rays of this bundle are those passing through any of the edges (8, 9, 10 and 11) of the two given segments.
Figure 1C:
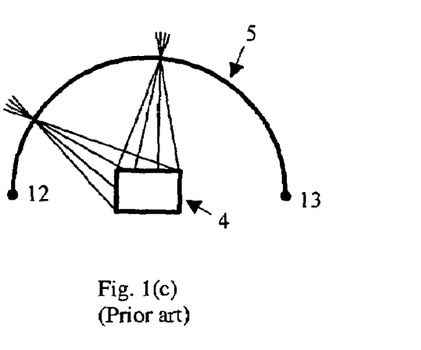
FIG. 1(c) illustrates a known type 3 bundle composed of the rays that intercept a rectangle (4) and a semicircle (5) of edges (12) and (13).

For the design of this invention two extended (e.g., not punctual) ray bundles are coupled in two-dimensional geometry (2D). The actual three-dimensional (3D) devices are obtained by rotational syniniefly (axisymmetrical) or translational symmetry (cylindrical), and their operation is analyzed a posteriori. Common examples of ray bundles (FIG. 1) are: (type 1) that composed of rays impinging on a segment (1) forming an angle inferior to a given angle (2) (called the acceptance angle of the bundle) with the perpendicular to this segment, and (type 2) that composed of the rays that intercept two given segments (3). Both types of bundle can be defined in a more general way (type 3) if the segments are substituted by arbitrary curves. FIG. 1 shows, in addition to two bundles of types type 1 in FIG. 1(a) and type 2 in FIG. 1(b), a bundle of type 3. in FIG. 1(c) composed of the rays that intercept a rectangle (4) and a semicircumference (5) (this bundle is useful for modeling an LED or an IRED). Another bundle of rays (type 4) can be described, with a more general character than those of types 1 and 2 (which includes them as particular cases), as that composed of the rays that impinge on a segment with an angle of incidence between two specified angles for each point of the segment.

The design of the present invention is based on the so-called edge-ray theorem of Nonimaging Optics (Welford, Winston, 1989), which states that to couple two bundles associated with the emitter and the receiver it is necessary and sufficient to couple the subsets of edge rays of the two. The use of this theorem is the key to obtaining devices that work very close to the thermodynamic limit with bundles with wide angular spread. For example, the edge rays of the bundles in FIG. 1 are, for the type 1 bundle, those that impinge on the segment with an angle of incidence equal to the acceptance angle of the bundle and those that pass through the edges (6) and (7) of the segment; for the type 2 bundle, those that pass through any of the edges (8), (9), (10) and (11) of the two given segments; and for the type 3 bundle, those that are tangent to the rectangle and those that pass through edges (12) and (13) of the semicircumference.

BRIEF DESCRIPTION OF THE DRAWINGS

FIGS. 4(*a*) and 4(*b*) illustrate teeth of the surface $S_2$ designed in the first phase for a device in accordance with the invention acting as a concentrator as in FIG. 4(*a*) or as a collimator as in FIG. 4(*b*). As they are of infinitesimal size (enlarged in the figure), the adjacent teeth are identical, and the edge-ray bundles are parallel. It is desired that the light incident through segment (33), of edges (34) and (35), with slope between that of rays (36) and (37), is transmitted optimally through segment (38), of edges (39) and (40), with slope between that of rays (41) and (42), which form angles (54) and (55) with the horizontal line, respectively. The geometry of the tooth with respect to its macroscopic tangent vector (32) is defined by the angles (56) and (57).

DETAILED DESCRIPTION OF THE PREFERRED EMBODIMENTS

Figure 2:
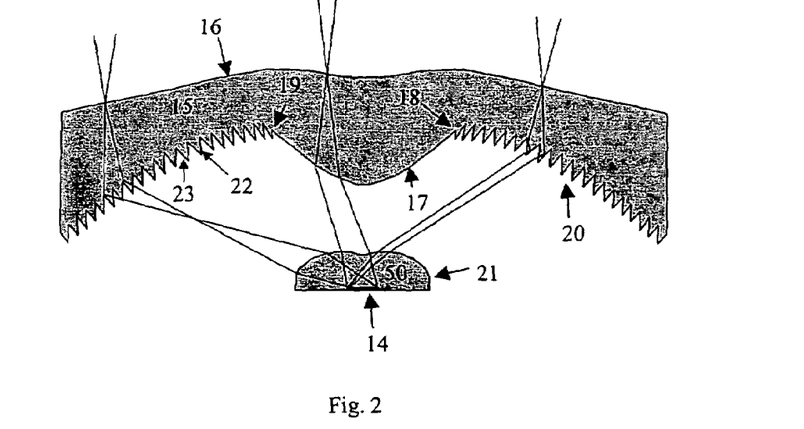
FIG. 2 illustrates a basic working principle of the invention as concentrator of radiation on a receiver (14). It comprises a lens (50) that surrounds the receiver comprising a refractive aspheric surface (21), and a second lens (15) whose upper side is a refractive aspheric surface (16) and whose lower side consists of another refractive aspheric surface (17) in its central region (between points 18 and 19) and a discontinuous-slope structure (20) in its external region; whose faces (22) fundamentally refract the rays and the faces (23) reflect them by total internal reflection.

A possible configuration of the invented device is that shown in FIG. 2, which also shows its basic working principle as a concentrator of radiation on a receiver (14). The lens (15) $L_1$ has two active faces: the upper refractive surface (16), referred to us $S_1$, which is in general aspheric, and the lower one, $S_2$, which consists of another refractive aspheric surface (17) in its central portion (between points (18) and (19), which we shall call P and P', respectively) and a structure with discontinuous slope (20) in its external portion. The lens (50) $L_2$ surrounds the receiver and consists of the refractive aspheric surface (21), which we shall call $S_3$. The collected rays that impinge on the central portion (17) undergo three consecutive refractions before reaching the receiver. On the other hand, the collected rays that impinge on the more external portion (20) undergo the following incidences before reaching the receiver: a first refraction on the surface $S_1$, a (possible) total internal reflection on the face (22) (which we shall call face V) of the teeth of $S_2$, a total internal reflection on the face (23) of chose teeth (which we shall call face T), a second refraction an face V, and finally, a third refraction on $S_3$. The total internal reflection occurs when the angle of incidence of the ray with the normal to the surface is greater than the so-called critical angle of the interface, which is given by $\sin^{-1}(1/n)$, n being the refractive index of the lens $L_1$.

Particular cases are those in which the profile of $S_1$ is circular or flat. The latter case is of especial interest in certain applications, such as photovoltaic concentration, since it permits the grouping of a set of devices fixed to a dielectric plate, such as a flat piece of glass, which acts as a reference to provide parallelism between the devices, as protection against the elements and as a filter for ultraviolet radiation.

In the design the surfaces $S_2$ and $S_3$ are calculated from the specification of the profile of the surface $S_1$ and of the input and output bundles. The definition of the input bundle can be made before its refraction on $S_1$, so that its definition would be independent of that of that surface. For example, it could be a type 1 bundle with acceptance α and with the edges of the segment coincident with the extreme points of the surface $S_1$. Another possibility, which could be interesting in practice, is that of defining the input bundle after its refraction on $S_1$, which allows, for example, the segment crossed by the rays of the bundle to be that defined by the two extreme points of the surface $S_2$. This implies that the specifications of the bundle and of the surface are interdependent: if we wish to define the bundle as that composed of the rays that impinge within the acceptance α before the refraction on $S_1$ and with the edges of the segment coincident with the two extreme points of the surface $S_2$, it will be necessary, in general, to carry out a ray-tracing on the surface $S_1$. In the case that the surface $S_1$ is flat, this ray-tracing is unnecessary, since the refraction in this dioptric is trivial, and the specification of the bundle after the refraction is therefore immediate by application of Snell's Law: it will be a type 1 bundle with acceptance angle equal to $\alpha' = \sin^{-1}(1/n \sin \alpha)$, n being the refractive index of the lens $L_1$.

Figure 3:
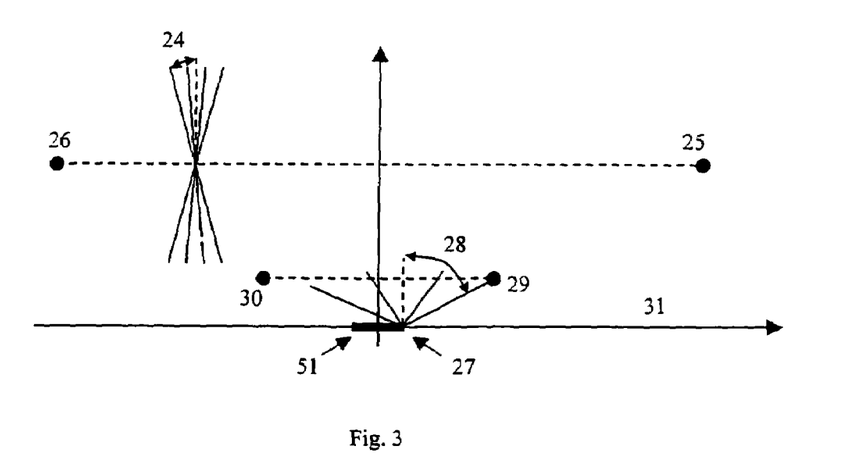
FIG. 3 illustrates a system of Cartesian coordinates (31) and initial geometric parameters for carrying out the chosen design for concentrating radiation on a receiver. The input bundle is defined by the acceptance angle (24) and by the entry aperture defined by the edges (25) and (26) of the surface S.sub.2. The output bundle is defined by the segment of edges (27) and (51), which is the receiver and it is illuminated from surface S.sub.3, whose edges are (29) and (30), with an angle of illumination limited to the acceptance angle (28).

In order to simplify the explanation, and by way of an example, let us suppose that $S_1$ is a plane, that the input and output bundles are both type 1, and that the two bundles are symmetrical with respect to an axis, as FIG. 3 shows. For the other types of bundle the procedure is analogous. The input bundle (specified after the refraction on $S_1$) is defined by the acceptance angle (24) with value α', and by the edges (25) and (26) of the surface $S_2$, which we shall call I and I', and which determine the segment we shall refer to as the entry aperture. The output bundle is defined by the receiver, which is the segment of edges (27) and (51), called respectively It and R', and by the angle of illumination limited to the acceptance angle (28) of value β (the normal consideration when the sensitivity of the receiver is low for very grazing angles, as is common in photodiodes or solar cells). The edges O and O' of the surface $S_3$ are the symmetrical points (29) and (30). This figure also shows the system of Cartesian coordinates (31) that will be used for the description, and whose origin is centered on the receiver.

Input design parameters (apart from the profile of the surface $S_1$) are the angles α and β, the distance RR', the refractive index of the dielectric materials to be used (n for the lens $L_1$ and n' for $L_2$), the ordinate of point I, the abscissa of point O and the abscissa of point P. The ordinate of point O is calculated immediately from its abscissa, the distance RR' and the angle β. However, the calculation of the abscissa of point I and of the ordinate of point P will be obtained later, as the result of the design.

The design procedure consists of three phases. In the first phase the design conditions for the teeth of the surface $S_2$ (which will be different for concentration and collimation)

are chosen, supposing that they are of infinitesimal size. With these conditions the calculation is made of the expressions that constitute the individual design of teeth for the different angles of incidence with respect to the mean normal vector of the tooth. Designed simultaneously in the second phase, with the SMS method, are the surfaces $S_2$ and $S_3$ that couple the output and input bundles, taking into account the expressions calculated in the first phase. Lastly, in the third phase, the teeth of the surface $S_2$ are generated with finite size (as manufactured in practice) on the basis of the infinitesimal teeth calculated in the previous phase.

There are different possible design modes, according to the level of complexity of the finite-size teeth of the surface $S_2$ both in their design in the third phase and in their manufacture. Thus, we can define as basic mode that in which the profiles of the T faces are rectilinear, as standard mode that in which these profiles are arcs of circumference and as advanced mode that in which they are aspheric. The three modes converge on one another when the size of the teeth is very small (providing an operating quality coincident with that predicted for infinitesimal teeth), but their performance degrades differently when the size of the teeth is greater. In increasing order of quality are the basic, standard and advanced modes. Since the design of the standard and advanced modes is carried out from the basic mode, we shall begin by describing this before proceeding with the explanation of the others.

Figure 4A:
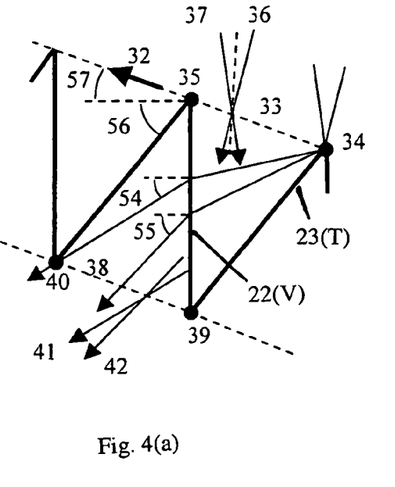

Let us consider for the first phase the description of a tooth designed in the first quadrant operating as a concentrator as shown in FIG. 4(a). Given that the size of the tooth is infinitesimal (enlarged in the figure), this means that, in the scale of the figure, adjacent teeth are identical, and that the wavefronts associated with the edge rays are flat. The vector (32), which we shall call t, is the macroscopic tangent vector of the surface $S_2$. It is desired that the light incident through segment (33), of edges (34) and (35), with slope between that of rays (36) and (37), which we shall call, respectively, e(+) and e(−), is transmitted optimally trough segment (38), of edges (39) and (40), with slope between that of rays (41) and (42), which we shall call, respectively, i (−) and i(+). To this end the following design characteristics will be imposed: (1) that no undesired incidences occur, and (2) that the irradiance on leaving the tooth is as uniform as possible. Both characteristics are obtained on demanding the two following conditions. On the one hand, that face V (also identified as face 22 of FIG. 2) is parallel to the bisector of the impinging bundle, which coincides with the so-called flow line of the bundle (Welford, Winston, 1989). Face V situated in this way has the property of reflecting (through total internal reflection) the bundle without its geometry being modified. On the other hand, it should be demanded that the ray e(−) that impinges at point (34), after the total internal reflection on face T and the refraction on face V, is transformed into the ray i(−) that passes through point (40). Note that rays i(−) transformed from rays e(−) pass through all the points of segment (38), but that rays i(+) emerge from only a portion of segment (38) (for this reason the irradiance is not uniform in (38), though it as uniform as possible, as required by condition (2)). Nevertheless, in the second phase the rays i(+) and i(−) will be used as though they emerged from the whole of segment (38), which means chat it will not be possible to reach the thermodynamic limit of concentration/collimation (although the invention comes very close to doing so).

These two conditions for the design of the infinitesimal teeth, which guarantee their optimum functioning, constitute another innovation with respect to the above-mentioned related patents, none of which includes these conditions.

Figure 4B:
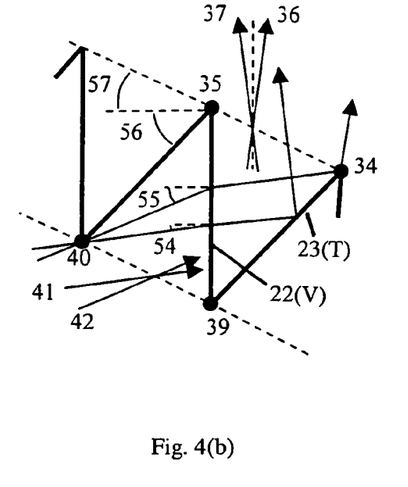

FIG. 4(b) shows a tooth for the basic design operating as a collimator. As it can be seen, the difference with respect to the case of FIG. 4(a), in which it was designed as a concentrator, lies in the second imposed condition: in this case it is the ray e(+) that impinges at (34) that must be transformed into the ray i(+) that passes through point (40).

On imposing the two mentioned conditions it is deduced that face V is vertical, and the following expressions relating the angles involved are obtained by trigonometric calculations:

$$\tan \delta = \tan \psi + (\sin \psi)(n^2 - \sin^2 \psi)^{-2} + \tan \gamma \quad \text{(Ec. 1.a)}$$

$$n \cos(2\delta - \alpha') + \sin \phi = 0 \quad \text{(Ec. 1.b)}$$

$$n \cos(2\delta + \alpha') + \sin \phi' = 0 \quad \text{(Ec. 1.c)}$$

where $\phi$, ($\phi'$, $\delta$ and $\gamma$ are, respectively, the angles (54), (55), (56) and (57) shown in FIGS. 4(a) and 4(b), n is the refractive index of the lens and $\psi \equiv \phi$ in the design of the concentrator and $\psi \equiv \phi$ in that of the collimator.

In the second phase, in which the profiles of the surfaces $S_1$ and $S_2$ are designed, the following steps are observed:

a) Select a value for the abscissa of point I (this value will be recalculated later).

b) Through the (inverse) application of Snell's Law, calculate the vector tangent to $S_3$ at point O with the condition that the ray that impinges from I must be refracted at O toward R.

c) Calculate the angle $\delta$ of the infinitesimal tooth situated at point I with the condition that the ray i(+) associated with the tooth is directed toward O. This can be achieved using the equation (Ec. 1.c), where the angle $\phi'$ is calculated from the points I and O. Calculate also the angle $\phi$ using (Ec. 1.b), the angle $\gamma$ using (Ec. 1.a), and from this, calculate $t_I$=(−cos $\gamma$, sin $\gamma$), which is the macroscopic vector tangent to $S_2$ at I.

d) Find the first section of $S_3$ above O with the condition that the rays proceeding from I are refracted on that portion toward the receiver with angle of incidence $\beta$. The solution to this problem is given by the constancy of optical path from point I up to a flat wavefront sloped with the angle $\beta$, and is an ellipse. This constitutes a particular case of the so-called Cartesian ovals. The tangent to $S_3$ at these points can be found, once these have been calculated, by (inverse) application of Snell's Law as in step a). The last point of this portion is marked by the ray that, after refraction, passes through R'.

e) Find the following section of $S_3$ with the condition that the rays proceeding from I are refracted on that portion toward point R'. Once again, the solution is given by the constancy of optical path between the two points, and constitutes a particular case of Cartesian ovals, and the tangent to $S_3$ at these points is found by (inverse) application of Snell's Law. The last point of this section, which will be called $H_0$ and its tangent $t_{H0}$, is that for whose calculation the ray i(−) that comes from I has been used.

f) Rename I, $t_I$, O and $t_O$ as $F_0$, $t_{F0}$, $G_0$ and $t_{G0}$, respectively. From the sections of $S_3$ calculated in d) and f) select a number M of uniformly-distributed points (for example, M=500) and name them from $F_1$ to $F_M$, with tangents $t_{F1}$ to $t_{FM}$. Note that $H_0 \equiv F_M$ (y $t_{H0} \equiv t_{FM}$).

g) Find the following macroscopic point $G_1$ of the surface $S_2$ as the point of intersection between the straight line that passes through $G_0$ with direction vector $t_{G0}$ and the trajectory of the ray refracted at $F_1$ proceeding from R (traced in the reverse direction). This ray is the ray i(+) associated with the infinitesimal tooth at $G_1$, so that it also gives the angle $\phi'$ at that point. With equations (Ec. 1.c), (Ec. 1.b) and (Ec. 1.a) we can calculate, respectively, the angles $\delta$, $\phi$ and $\gamma$, and from the last of these, $t_{G1}=(-\cos\gamma, \sin\gamma)$, which is the macroscopic vector tangent to $S_2$ at $G_1$.

h) Calculate the following point $H_1$ of the surface $S_3$ as the point of intersection between the straight line that passes through $H_0$ with direction vector $t_{H0}$ and the ray i(−) associated with the infinitesimal tooth of $G_1$. The tangent $t_{H1}$ to $S_3$ at $H_1$ can once more be found by (inverse) application of Snell's Law. Identify $H_1 \equiv F_{M+1}$ (and $t_{H1} \equiv t_{FM+1}$).

i) Repeat steps g) and h), increasing the subindices by one unit, until the abscissa of a point $G_n$ is greater than the abscissa of point P (selected as entry parameter). Since the precision on the abscissa of point P chosen is not important (and that, this precision being determined by the value of the chosen parameter M in step f), it can be improved through choice), it will be considered for what follows that $P \equiv G_n$.

The profile of the central region of $S_2$ (between P and P') will be calculated (together with the remaining portion of $S_3$), once again according to the edge-ray theorem, so that it directs the rays e(+) toward R' and the rays e(−) toward R (Note that this assignment is the opposite of what was carried out in steps g) and h) for the exterior portion of $S_2$). Given that the surfaces are continuous, this implies that the optical path from the wavefront associated with rays e(+) up to R' will be constant, as will that from the wavefront associated with rays e(−) up to R. So that the surfaces $S_2$ and $S_3$ do not have discontinuities in their respective vertices, the symmetry of the design obliges the two optical paths (measured with respect to symmetrical wavefronts), moreover, to be equal. This condition will allow to evaluate the initial choice of the abscissa of point I.

j) Find the tangent to $S_2$ at P so that the impinging ray e(−) is transformed after refraction into the ray i(+) calculated at point P in step i). Calculate the ray e(+) after the refraction at P. If the angle it forms with the horizontal is superior to the angle $\phi$ calculated at point P in step i), return to the beginning choosing a lower value for the abscissa of point P.

k) Calculate a new section of $S_3$ next to point $H_n$ found in step i) with the condition that the rays coming from P are refracted on that portion toward point R'. Once more, the solution is given by the constancy of optical path between the two points, and the tangent to $S_3$ at these points is found by (inverse) application of Snell's Law. The last point of this section is that for whose calculation the ray e(+) after refraction at P has been used. Choose a number M' of uniformly-distributed points (for example, M'=50) and name them in a way correlative to the previous ones, that is, from $H_{n+1}$ to $H_{n+M'}$ (and from $F_{M+n+1}$ to $F_{M+n+M'}$).

l) Calculate the optical paths C(+) and C(−) associated with the rays e(+) up to R' and the rays e(−) up to R, respectively.

m) Repeat the steps from a) to l) iterating on the value of the abscissa of point I until it is achieved that $|1-C(+)/C(-)| < \epsilon$, with $\epsilon$ being a pre-fixed margin of error (e.g., 0.0001).

n) Calculate the following point $G_{n+1}$ of $S_2$ with the condition that the trajectory of the ray refracted at $F_{n+1}$ coming from R (traced in the reverse direction) is transformed after refraction at the desired point into a ray e(−). Once again, the solution is calculated because the optical path C(−) is known, and the tangent to $S_2$ at $G_{n+1}$ is found by (inverse) application of Snell's Law.

o) Calculate the following point $H_{n+M'+1}$ of $S_3$ with the condition that the trajectory of the ray e(+) refracted at $G_{n+1}$ is directed, after refraction at the desired point toward R'. Again, the solution is calculated because the optical path C(+) is known, and the tangent to $S_3$ at $H_{n+M'+1}$ is found by (inverse) application of Snell's Law.

p) Repeat steps n) and o) until the symmetry axis is reached, that is, until the abscissas of points G and H calculated are negative.

Finally, to conclude the basic design there remains only the third phase, which involves the generation of the teeth of $S_2$ with finite size (as they will be manufactured in practice) and faces with rectilinear profile on the basis of the macroscopic surface and the infinitesimal teeth calculated in the previous phase. The procedure moves from the edge toward the center of the lens observing the following steps:

a) Select, for example, size D of the horizontal projection of the finite teeth. This size should be such that that the subsequent ray-tracing shows no important degradation in the functioning of the device with respect to that obtained with size D/2.

b) Take as central points of the finite teeth those points $G_i$ of the macroscopic surface between P and I whose abscissa differ less from point I by an odd number of times D/2.

c) Define the slope of the face T of the finite tooth to which $G_i$ belongs as the slope of the face T defined at $G_i$ by the infinitesimal tooth. The face T of the finite tooth is extended symmetrically with respect to the point.

d) The faces V are thus situated at abscissas that differ from point I by a whole number of times D.

The basic concentrator design is complete. In this last phase another criterion can be taken for the generation of finite teeth, such as that the distance between the upper and lower evolvent of the teeth takes the value D. The generation procedure is similar to that described, and the adjustment of the central points $G_i$ of each tooth can carried out in an iterative way.

The standard mode differs from the basic mode in the third phase, where the faces T of the finite teeth have an arc of circumference as a profile. The design procedure of this mode is similar to that of the basic one. In the second phase, although the resulting design is identical, the standard mode adds the calculation of the curvature of the faces T of the infinitesimal teeth (for its later use in the third phase), which constitutes a higher order of precision than that employed in the basic mode. In order to make this calculation the following equation is used, which relates the radii of curvature of a surface and those of the incident and refracted/reflected wavefronts:

$$\frac{n_i \cos^2\theta_i}{\rho_i} + \frac{n_r \cos^2\theta_r}{\rho_r} = \frac{n_i \cos\theta_i - n_r \cos\theta_r}{\rho_s} \qquad (Ec.\ 2)$$

where the subindices i, r and s refer to the incident wavefronts, refracted/reflected wavefronts and the surface, respectively, n denotes the refractive index, $\theta$ the angle of the ray with respect to the normal and $\rho$ the radius of curvature. Equation (Ec. 2) is applied to the reflection, making $\theta_r = \theta_i$ and $n_r = -n_i$.

In order to calculate the radius of curvature $\rho_{sT}$ of the face T of the infinitesimal teeth it is necessary to find previously the radius of curvature of $S_3$ at points $F_1$ to $F_M$ during their calculation in steps d) and e) of the second phase. For this the expression (Ec. 2) is applied to the refraction at these points of the rays coming from I. In this case, for each point $F_k$ and denoting by $\overline{AB}$ the length of the segment of edges A and B, we have $\rho_i=\overline{IF_k}$, $\rho_r=\infty$ in step d) and $\rho_r=\overline{RF_k}$ in step e).

It is in step f), in which the points $G_k$ are calculated on the basis of the points $F_k$, where the desired values of $\rho_{sT}$ should be calculated. The calculation involves the use of the expression (Ec. 2) for the three successive incidences undergone by the ray that goes (in the reverse direction) from R toward $F_k$. Given that in step f) the points and the normals to the surfaces are calculated, the angles of incidence and of refraction/reflection, like the refractive indices, are known parameters in the three incidences. In the first, at $F_k$, as the radius of curvature $\rho_s$ is already known and $\rho_i=\overline{RF_k}$, from (Ec. 2) we obtain the radius of curvature of the refracted wavefront $\rho_{r1}$. For the second incidence, which occurs on the face V of the tooth calculated at $G_k$, the radius of curvature of the incident wavefront is $\rho_i=\overline{G_kF_k}-\rho_i$ and the radius of curvature of the surface is known ($\rho_{sV}=\infty$), so that from (Ec. 2) we obtain the radius of curvature of the refracted wavefront $\rho_{r2}$. Finally, for the third incidence, which occurs on the face T of the tooth, it is known that $\rho_i=-\rho_{r2}$ and $\rho_{r3}=\infty$, so that (Ec. 2) can be solved with the radius of curvature $\rho_{sT}$ as an unknown, which was the desired value.

Given that in step g) new points $F_j$, are calculated, initially called $H_k$, and which will be used again in step f) on repeating it as h) indicates, it is also necessary to calculate the radius of curvature of $S_3$ at these points. For this, the procedure is analogous to that of the calculation of $\rho_{sT}$ previously indicated, using the trajectory of the ray used to calculate $H_k$, which is the ray e(+) impinging at $G_k$, and taking advantage of the fact that $\rho_{sT}$ is already known.

The third phase of the standard mode, which concerns the generation of the teeth of finite size, differs from the basic mode in that the T faces, instead of being rectilinear, are generated as arcs of circumference. The procedure of generating the teeth is analogous to that seen for the basic mode, the only difference being that the face T of the finite tooth to which the central point $G_i$ of a finite tooth belongs is the arc of circumference that passes through that point, with the slope and radius of curvature associated with the infinitesimal tooth, and that extends symmetrically with respect to the point. This concludes the standard design mode.

Lastly, the advanced design mode is characterized by the faces T of the teeth having an aspheric profile. The calculation of these profiles is made from the finished basic design (with finite teeth), observing the following steps:
  a) Trace in the reverse direction the uniparametric ray bundles that leave from R and R' and are refracted on $S_3$ and on the faces V of the finite teeth.
  b) For each tooth, whose central point is $G_i$, calculate the aspheric profile of the face T that passes through $G_i$ and whose points Q are such that the ray that impinges vertically is reflected in accordance with the direction bisecting of the rays of the uniparametric bundles that pass through Q calculated in a). This problem, which can be expressed in the form of a first-order differential equation, has a single solution when one ray—and only one of each bundle—passes through each point Q.

Figure 11:
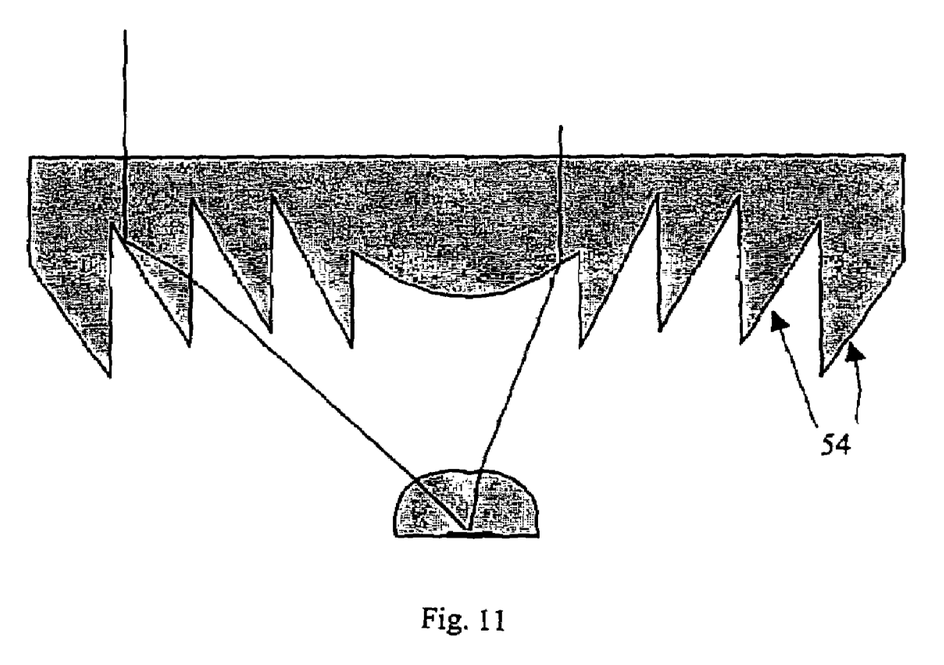
FIG. 11 illustrates a device in accordance with the invention with aspheric faces (54) in an advanced mode, which allows them to be larger while maintaining excellent performance.

The advanced design mode is finished. FIG. 11 shows an example of an advanced design. As mentioned above, the aspheric profiles (54) of the facets allows to design them with bigger size than in the basic and standard modes, and still maintain an excellent performance, even close to the thermodynamic limit.

The description of the design procedures for the three modes (basic, standard and advanced) is finished.

The design is essentially similar in the case that the profiles of the faces V are not vertical lines, but have a pre-fixed sloping rectilinear, circular or aspheric profile. In fact, an aspect not considered in the descriptions of the designs concerns the fact that the manufacture of teeth with totally vertical faces V may be impractical (in the case of lens manufacture by plastic injection, removal of the part from the mould is difficult). It is possible to correct this aspect, for example, by considering design of the faces V with inclinations of a certain angle (in the range of 0.5° to 1° may be sufficient), which entails appropriate modification of the equations (Ec. 1). Said inclination is also useful to avoid the undesired effects produced in practice by the rounding of the vertices of the teeth. As a negative consequence, a sloping face V means that it is not parallel to a flow line of the incident bundle, so that the reflection on that face will modify (slightly) the geometry of the bundle. This means that the characteristic of angular transmission will be degraded (i.e., it will be less stepped) with respect to that corresponding to vertical faces V. Meanwhile, the profiles of the faces V can be produced as arcs of circumference or pre-fixed aspheric curves to facilitate their manufacture even more (at the cost of making the production of the mould more difficult), by decreasing, for example, the curvature necessary for the profiles of the faces T.

Another aspect not dealt with up to now concerns the fact that the condition imposed on the design of the infinitesimal teeth in concentration that obliges the edge ray e(−) impinging at point (34) to be transformed into the ray i(−) that passes through point (40) may be relaxed (i.e., allowing it to pass slightly above or below that point) without producing a serious degradation in functioning.

Taking into account all of these considerations, we can affirm the usefulness of the possibility of the profiles of the faces V or T having at each point a slope modified by an angle of less than 2 degrees.

The device described for concentrating radiation on a receiver may be axisymmetrical or cylindrical, and is characterized by transforming the edge rays of an input extended ray bundle into edge rays of an output extended ray bundle that illuminates a receiver, both bundles being defined in the plane of a cross-section (which contains the symmetry axis in the axisymmetrical case, or is perpendicular to the direction of symmetry in the cylindrical case), by means of: (a) a lens $L_1$ composed on one side of a refractive aspheric surface, $S_1$, on which the input bundle impinges, and on the other side, $S_2$, of another refractive aspheric surface in its central region and with a discontinuous-slope structure in its external region, whose cross-section is formed of teeth with two aspheric faces such that one of them, V, is parallel to the flow lines of the bundle transmitted by the dioptric $S_1$, and the other face, T, reflects the bundle by total internal reflection toward the face V where it is refracted so that no ray intercepts the adjacent tooth and that the nearest edge ray to do so is tangent to that tooth; and (b) a second lens $L_2$ that surrounds the receiver composed of an refractive aspheric surface on which the bundle transmitted by the lens $L_1$ impinges.

On the other hand, the device used for collimating the radiation generated by an emitter may be axisymmetrical or cylindrical, and is characterized by transforming the edge rays of an input extended ray bundle generated by an emitter into edge rays of an output extended ray bundle, both bundles being defined in the plane of a cross section, by means of: (a) a lens $L_2$ that surrounds the emitter composed of a refractive aspheric surface on which the input bundle impinges; and (b) a second lens $L_1$ composed on one side of a refractive aspheric surface, $S_1$, from which the output bundle leaves, and on the other side, $S_2$, of another refractive aspheric surface in its central region and with a discontinuous-slope structure in its external region, whose cross-section is formed of teeth with two aspheric faces such that on one of them, V, the bundle transmitted by the dioptric $S_3$ is refracted so that all the rays are reflected by total internal reflection on the other face, T, that the edge ray nearest to not being reflected is tangent to the profile of the tooth, and that the face V is parallel to the flow lines of the bundle transmitted toward $S_1$.

The U.S. Pat. No. 5,577,493, November 1996 describes an axisymmetric device which is qualitatively similar to this invention and it is used to collimate the radiation generated by an emitter and in which the bundles of rays are chosen to provide uniform irradiance in three dimensions at the exit aperture. However, due to the restrictions of their design method, their device will provide such performance only when the angular spread of the ray bundles on passing through any of the optical surfaces is small (<10°). Moreover, the design conditions of the infinitesimal teeth used in this invention (Equations 1.a, 1.b, and 1.c), which guarantee the optimal performance of the teeth, are not used in the existing patent, which lead to the optical surfaces of their invention being substantially different, and their resulting optical performance being noticeably inferior.

Figure 5:
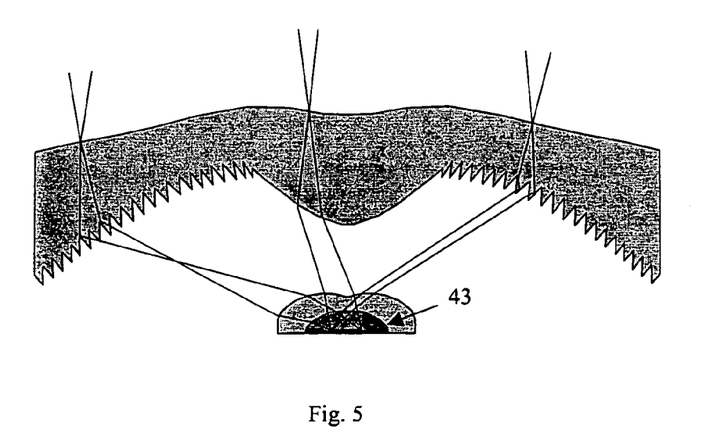
FIG. 5 illustrates a lens $L_2$ produced with two different dielectric materials separated by a spheric or aspheric refractive surface (43).

The procedures described for the three design modes are equally applicable to the situation shown in FIG. 5, in which the lens $L_2$ consists of two different dielectric materials separated by a spheric or aspheric refractive surface (43), with pre-fixed profile, just considering the refraction of the edge rays on this surface during the process.

Figure 6:
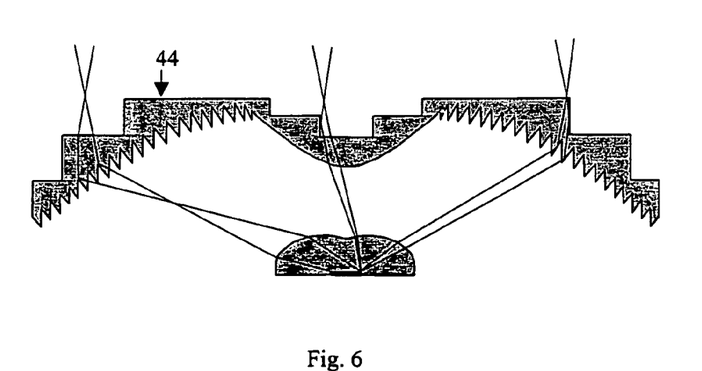
FIG. 6 illustrates a lens wherein surface $S_1$ can be substituted by a discontinuous-slope Fresnel structure (44), which reduces weight and absorption.

A variant of the configuration described up to now consists in substituting the refractive surface $S_1$ by a discontinuous-slope Fresnel structure (44), as shown for example in FIG. 6 for the case of the flat and horizontal $S_1$. It is thus possible to use less dielectric material, which reduces its weight and absorption The two surfaces, discontinuous and continuous, work in the same way. In fact, the profiles of the remaining optical surfaces are identical in the two designs. The only difference with respect to the trajectories of the rays is that these can now impinge on the vertical face of the steps, the face that coincides with the flow lines of the incident bundle. This implies, once again) that if these faces were mirrors the reflection of the rays on them would not modify the geometry of the transmitted bundle. Although when the incidence takes place from the interior face of the dielectric material this interface indeed behaves like a mirror due to the phenomenon of total internal reflection, this is not the case with incidence from the air, which leads to some losses. Nevertheless, for small acceptance angles $\alpha(<5°)$ these losses are negligible due to the combination of two effects: the reflectivity of this interface, although not 100%, is very high for large angles of incidence (and in the present case they will be superior to 90°-$\alpha$), and the fraction of rays that impinge on the vertical faces from the air is also small if the acceptance angle is moderate.

Figure 7:
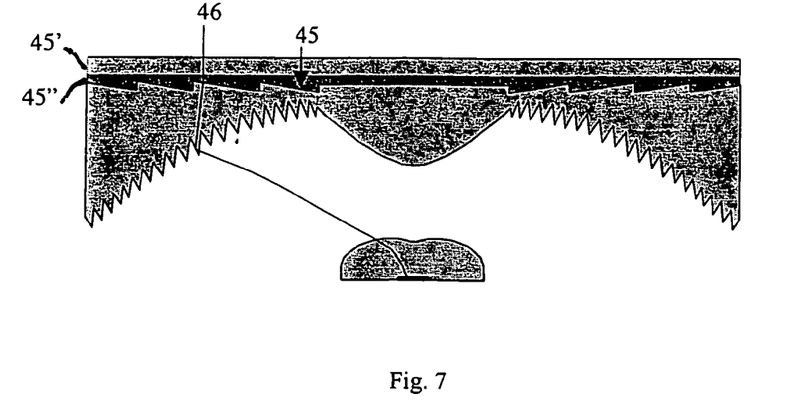
FIG. 7 illustrates a design of the surface $S_1$ as a discontinuous-slope structure (45) with saw-toothed profile, which allows transmission losses to be minimized when the faces V do not coincide with flow lines (46) of the bundle transmitted by the continuous surface $S_1$.

The surface $S_1$ as a discontinuous-slope structure can also have another use, as FIG. 7 shows. In this case the flat dioptric of FIG. 2 has been substituted by a discontinuous-slope structure with saw-toothed profile (45) that diverts the input bundle to modify the direction of the flow lines (46). The lens is attached to a dielectric plate 45' by means of an adhesive 45" with a refractive index slightly different from that of the lens. This structure refracts the rays of the incident bundle so that they progress toward $S_2$ with a slight divergent direction. This means that the face V of the teeth of the external region of $S_2$, if designed with a non-null tilt angle to facilitate manufacture, will produce a lesser degradation of the optical performance on being closer to (or even coinciding with) the divergent flow line. As the vertical face of the $S_1$ in turn causes a degradation (by blocking the ray trajectories), for each inclination of the faces V there is an optimum angle of divergence of the bundle, for which degradation is minimum.

Figure 8:
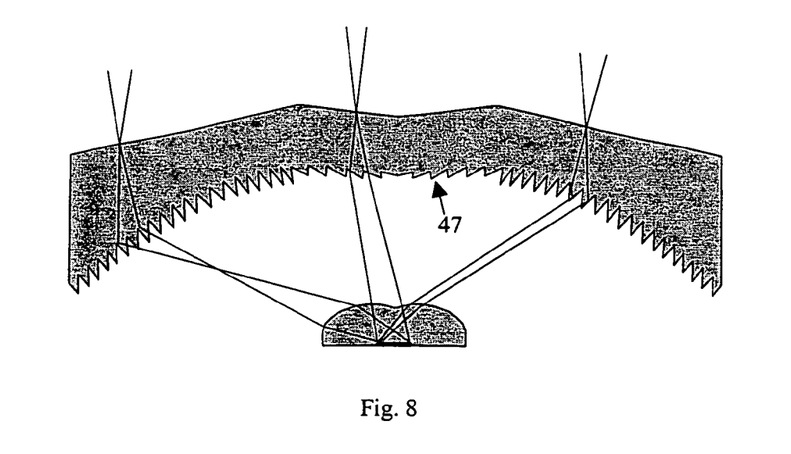
FIG. 8 illustrates a lens wherein the central portion of $S_2$ can be substituted by a discontinuous-slope Fresnel structure (47).

Another possibility (which can also be combined with any of the previous ones) consists in making the central portion of $S_2$ as a discontinuous-slope Eresnel structure (47), as shown in figure FIG. 8.

Figure 9:
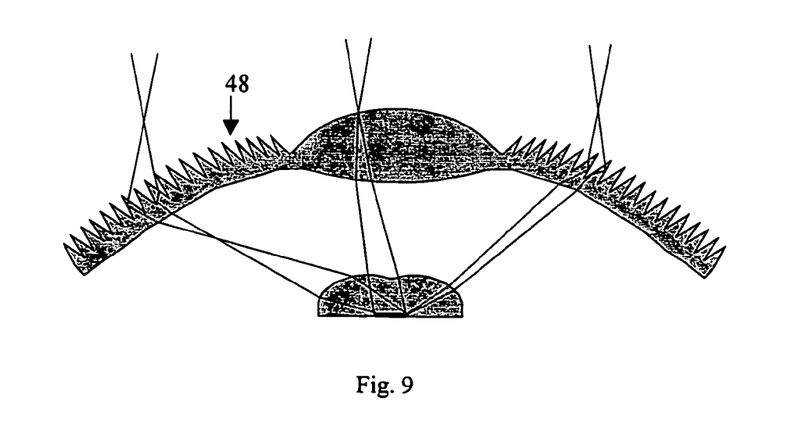
FIG. 9 illustrates a configuration wherein surfaces $S_1$ and $S_2$ of the previous figures are interchanged, so that the teeth appear inverted (48).

Another possible configuration consists in designing the lens with the surfaces $S_1$ and $S_2$ interchanged, so that the teeth appear inverted (48), as shown in FIG. 9, In the case of rotation symmetry, for its production by moulding, it is necessary for either the mould or the lens to be flexible, so that the lens can be extracted from the mould. In the case of translation symmetry this would be unnecessary, since manufacture could be by extrusion. The design procedure of the optical surfaces is common to all the configurations indicated.

In the proposed invention, used for concentrating radiation on a receiver, this could be optoelectronic, such as a photodiode, phototransistor or solar cell. On the other hand, if it is used for collimating the radiation produced by an emitter, this could also be optoelectronic, such as an LED, an IRED or a laser.

Figure 10:
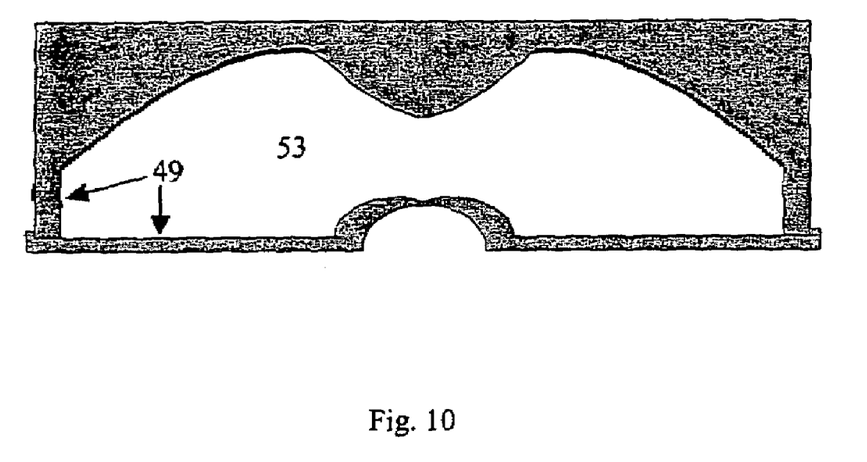
FIG. 10 illustrates a device having an optically inactive portion (49) that joins the two lenses, and in such a way that they constitute a single piece that includes an interior space (53).

The manufacturing of the concentrator of this invention can be carried out using a diamond-tip lathe with numerical control (CNC) on plastic material, such as acrylic (PMMA). Another possibility worthy of mention is that of the injection of the PMMA in a suitable mould, which allows a production also covered by this application, and which is shown in FIG. 10: the device can be manufactured with an optically inactive portion (49) chat joins the two lenses, and in such a way that they constitute a single piece that includes an interior space (53). The joining can be carried out by contact before solidification of the final injected part or by means of subsequent gluing. As it is a single piece, the space between the lenses is protected from dust and humidity. This space can be evacuated or filled, if desired, with an inert gas. The adhesion of the receiver or the emitter to the secondary can be carried out by means of the casting of a transparent epoxy resin.

The improvements and differences this invention introduces with respect to the mentioned state of the art can be summarized as follows:

(a) The designed surfaces and the faces of the teeth are such that the device couples in two dimensions the edge rays of two extended ray bundles, while those of the mentioned inventions couple only the central ray of the bundles or its first-order environment.

(b) In the case of the axisymmetric device to collimate the radiation generated by an emitter, the design ray bundles include as a particular case the one that produces uniform irradiance in the exit aperture, the case considered in the U.S. Pat. No. 5,577,493, November 1996, but in said patent the design that is described there is only adequate when the angular spread of the ray bundles on passing through all of the optical surfaces is small (<10°).

(c) The conditions for the design of the infinitesimal teeth facets used in this invention (given by the Equations 1.a, 1.b & 1.c, which provide that the faces of the teeth are such that one guides the bundle as a flow line, they produce maximum uniformity of irradiance at the exit of the tooth, and they avoid undesired incidence on the adjacent tooth) are not used in the previous state of the art, which lead to the optical surfaces of the invention being substantially different, and also their resulting optical performance.

(d) Its use as a concentrator on a receiver.

(e) The cylindrical symmetry, where appropriate.

(f) Its possible manufacture as a single part with an interior space.

(g) The grouping of a set of devices fixed to a dielectric plate.

Differences (a) and (c) confer upon this invention an optical performance noticeably superior to that of the previous inventions, especially when the angular spread of the ray bundles as they pass through any of the optical surfaces is large (>10°).

INDUSTRIAL APPLICATION

The presented invention has direct applications in diverse fields, such as that of radiation sensors, illumination systems with LEDs, wireless optical communications or photovoltaic solar energy.

In the field of sensors, the proposed invention allows the achievement of high sensitivities, close to the thermodynamic limit, without affecting the simplicity and compactness of the device. Also, in the field of illumination with LED, this invention provides an optimally-collimated bundle with a geometry readily compatible with current production techniques.

In wireless optical communications, the control of angular response of the emitting and receiving devices and the use of almost all possible directions of emission/reception in the design permits connections whose signal-noise relationship is close to the maximum possible. Employed in reception, the proposed invention would use an optoelectronic sensor as receiver (e.g., a photodiode or phototransistor); in transmission the invention would use an optoelectronic emitter (LED, IRED or laser).

Finally, in photovoltaic applications this invention constitutes an appropriate device for high-concentration solar cells. Its performance close to the theoretical limit means that for a given concentration factor, the angular acceptance of the device is close to the maximum possible, which is useful for permitting high tolerances in the manufacture of the device itself and in the alignment of several of them to form a module (which can be made simply by gluing them to a flat piece of glass), a light support structure for modules with low sun-tracking accuracy.

The invention claimed is:

1. Device for concentrating radiant energy wherein said device is axisymmetrical or cylindrical and is configured to transform the edge rays of an input extended ray bundle into edge rays of an output extended ray bundle, the optical spread of said input and output bundles being greater than ten degrees at one or more of the optical surfaces of said device, that illuminates a receiver, both of said bundles being defined in the plane of a cross-section, by:
   a) A lens $L_1$ comprising on one side a refractive aspheric surface, $S_1$, on which the input bundle impinges, and on the other side, $S_2$, another refractive aspheric surface in its central region and a discontinuous-slope structure in its external region, said discontinuous-slope structure cross-section comprising teeth with two aspheric faces such that one of them, V, is configured to be parallel to the flow lines of the bundle transmitted by said surface $S_1$, and the other face, T, os configured to reflect the bundle by total internal reflection toward the face V where it is retmoted so that no ray intercepts an adjacent tooth and that a nearest edge ray to do so is tangent to that tooth, and
   b) A second lens $L_2$ that surrounds the receiver composed of a refractive aspheric surface on which the bundle transmitted by the lens $L_1$ impinges.

2. Device for concentrating radiant energy according to claim 1 wherein said receiver comprises an optoelectronic receiver.

3. Device for concentrating radiant energy according to claim 1 wherein said receiver is one of a photodiode, a phototransistor or a photovoltaic cell.

4. Device for concentrating radiant energy according to claim 1 wherein the profiles of the faces of the teeth have at each point a slope modified by an angle of less than 2 degrees.

5. Device for concentrating radiant energy according to claim 1 wherein the profile of $S_1$ is circular or flat.

6. Device for concentrating radiant energy according to claim 1 wherein the surfaces $S_1$ and $S_2$ of the lens are interchanged, so that the teeth appear inverted.

7. Device for concentrating radiant energy according to claim 1 wherein $S_1$ has a saw-toothed profile that diverts the input bundle to modify the direction of the flow lines.

8. Device for concentrating radiant energy according to claim 1 wherein $S_1$ or the refractive surface of the central portion of $S_2$, or both, are discontinuous-slope Fresnel structures.

9. Device for concentrating radiant energy according to claim 1 wherein the lens $L_2$ comprises two different dielectric materials separated by a spheric or aspheric refractive surface.

10. Device for concentrating radiant energy according to claim 1 wherein the cross-section of the teeth of $S_2$ have faces with circular or rectilinear profiles.

11. Device for concentrating radiant energy according to claim 1 comprising an optically inactive portion joining the two lenses so that they constitute a single part that includes an interior space.

12. Device for concentrating radiant energy according to claim 1 fixed to a dielectric plate.

13. Device according to claim 1, wherein at least one of said surfaces $S_1$, $S_2$, or $S_3$ comprises a Cartesian oval.

14. Device for collimating radiant energy wherein said device is axisymmetrical or cylindrical and is configured to transform the edge rays of an input extended ray bundle generated by an emitter into edge rays of an output extended ray bundle, the optical spread of said input and output bundles being greater than ten degrees at one or more of the optical surfaces of said device, both of said bundles being defined in the plane of a cross-section, by:
   a) A lens $L_2$ that surrounds the emitter and comprising a refractive aspheric surface $S_3$ on which the input bundle impinges, and
   b) A second lens $L_1$ comprising on one side a refractive aspheric surface, $S_1$, from which the output bundle leaves, and on the other side, $S_2$, another refractive aspheric surface in its central region and a discontinuous-slope structure in its external region, said discontinuous-slope structure cross-section comprising teeth with two aspheric faces such that on one of them, V, the bundle transmitted by said surface $S_3$ is configured to be refracted so that all the rays are reflected by total internal reflection on the other face, T, that an edge ray nearest to not being reflected is tangent to the profile of the tooth, and that the face V is configured to be parallel to the flow lines of the bundle transmitted toward $S_1$.

15. Device for collimating radiant energy according to claim 14 wherein said emitter comprises an optoelectronic emitter.

16. Device for collimating radiant energy according to claim 14 wherein said emitter is one of an LED, an IRED or a laser.

17. Device for collimating radiant energy according to claim 14 wherein the profiles of the faces of the teeth have at each point a slope modified by an angle of less than 2 degrees.

18. Device for collimating radiant energy according to claim 14 wherein the profile of $S_1$ is circular or flat.

19. Device for collimating radiant energy according to claim 14 wherein the surfaces $S_1$ and $S_2$ of the lens are interchanged, so that the teeth appear inverted.

20. Device for collimating radiant energy according to claim 14 wherein $S_1$ has a saw-toothed profile that diverts the input bundle to modify the direction of the flow lines.

21. Device for collimating radiant energy according to claim 14 wherein $S_1$ or the refractive surface of the central portion of $S_2$, or both, are discontinuous-slope Fresnel structures.

22. Device for collimating radiant energy according to claim 14 wherein the lens $L_2$ comprises two different dielectric materials separated by a spheric or aspheric refractive surface.

23. Device for collimating radiant energy according to claim 14 wherein the cross-section of the teeth of $S_2$ have faces with circular or rectilinear profiles.

24. Device for collimating radiant energy according to claim 14 comprising an optically inactive portion joining the two lenses so that they constitute a single part that includes an interior space.

25. Device for collimating radiant energy according to claim 14 fixed to a dielectric plate.

26. Device according to claim 14 wherein at least one of said surfaces $S_1$. $S_2$. or $S_3$ comprises a Cartesian oval.

27. Device for collimating radiant energy, said device being axisymmetrical or cylindrical and configured to transform the edge rays of an input extended ray bundle generated by an emitter into edge rays of an output extended ray bundle, both bundles being defined in the plane of a cross-secnon, excluding the axisymmetric case in which the bundles of rays are chosen to provide uniform irradiance in three dimensions at the exit aperture when the angular spread of the input and output ray bundles on passing through all of the optical surfaces is smaller than 10°, by:

a) A lens $L_2$ that surrounds the emitter comprising a refractive aspheric surface $S_3$ on which the input bundle impinges, and b) A second lens $L_1$ comprising on one side a refractive aspheric surface, $S_1$, from which the output bundle leaves, and on the other side, $S_2$, another refractive aspheric surface in its central region and a discontinuous-slope structure in its external region, whose cross-section is formed of teeth with two aspheric faces such that on one of them, V, the bundle transmitted by surface $S_3$ is configured to be refracted so that all the rays are reflected by total internal reflection on the other face, T, that the edge ray nearest to not being reflected is tangent to the profile of the tooth, and that the face V is configured to be parallel to the flow lines of the bundle transmitted toward $S_1$.

28. Device according to claim 27 wherein at least one of said surfaces $S_1$, $S_2$, or $S_3$ comprises a Cartesian oval.

* * * * *